United States Patent
Ulm

[19]

[11] Patent Number: 5,826,204
[45] Date of Patent: Oct. 20, 1998

[54] CIRCUIT CONFIGURATION FOR EVALUATION OF THE SIGNALS FROM A YAW RATE SENSOR

[75] Inventor: Michael Ulm, Alteglofsheim, Germany

[73] Assignee: Siemens Aktiengesellschaft, Munich, Germany

[21] Appl. No.: 921,819

[22] Filed: Sep. 2, 1997

Related U.S. Application Data

[63] Continuation of Ser. No. 656,413, filed as PCT/DE94/01341, Nov. 14, 1994, abandoned.

[30] Foreign Application Priority Data

Nov. 30, 1993 [DE] Germany .......................... 43 40 719.6

[51] Int. Cl.⁶ ..................................................... G05D 1/02
[52] U.S. Cl. .................................................. 704/1; 701/72
[58] Field of Search ................................. 701/1, 36, 41, 701/44, 70, 72, 82, 91; 180/197, 76, 249

[56] References Cited

U.S. PATENT DOCUMENTS

| | | | |
|---|---|---|---|
| 5,001,636 | 3/1991 | Shiraishi et al. | 364/424.05 |
| 5,229,955 | 7/1993 | Nishiwaki et al. | 364/424.05 |
| 5,261,503 | 11/1993 | Yasui | 364/424.05 |
| 5,274,576 | 12/1993 | Williams | 364/424.05 |
| 5,285,390 | 2/1994 | Haseda et al. | 364/424.05 |
| 5,333,058 | 7/1994 | Shiraishi et al. | 364/424.05 |
| 5,402,342 | 3/1995 | Ehret et al. | 364/424.05 |
| 5,417,298 | 5/1995 | Shibahata | 180/76 |
| 5,446,657 | 8/1995 | Ikeda et al. | 364/424.05 |
| 5,457,632 | 10/1995 | Tagawa et al. | 364/424.05 |

FOREIGN PATENT DOCUMENTS

| | | |
|---|---|---|
| 33 46 434 | 7/1985 | Germany . |
| 39 19 347 | 2/1990 | Germany . |
| 90/12698 | 11/1990 | WIPO . |

*Primary Examiner*—Gary Chin
*Attorney, Agent, or Firm*—Herbert L. Lerner; Laurence A. Greenberg

[57] ABSTRACT

A control loop, preferably for movement stability regulation in a motor vehicle, has a yaw rate sensor supplying an electrical sensor signal and a temperature sensor supplying an electrical sensor signal for compensation of temperature dependency of the sensor signal of the yaw rate sensor. A circuit configuration for evaluation of the sensor signal of the yaw rate sensor includes a first evaluation device for calculating an instantaneous yaw rate from the electrical sensor signals of the yaw rate sensor and of the temperature sensor, and a second evaluation device for adaptively determining sensor-specific characteristic parameters of the yaw rate sensor as a function of temperature. A reference yaw rate $\Psi_{ref}$ being calculated from measured wheel rotation speed values $v_l$ and $v_r$ in accordance with the following formula:

$$\dot{\Psi}_{ref} = \frac{v_l - v_r}{l_{trackw}}$$

is taken into account, where $l_{trackw}$ designates a distance between two centers of contact of wheels on a non-driven axle with the ground.

6 Claims, 4 Drawing Sheets

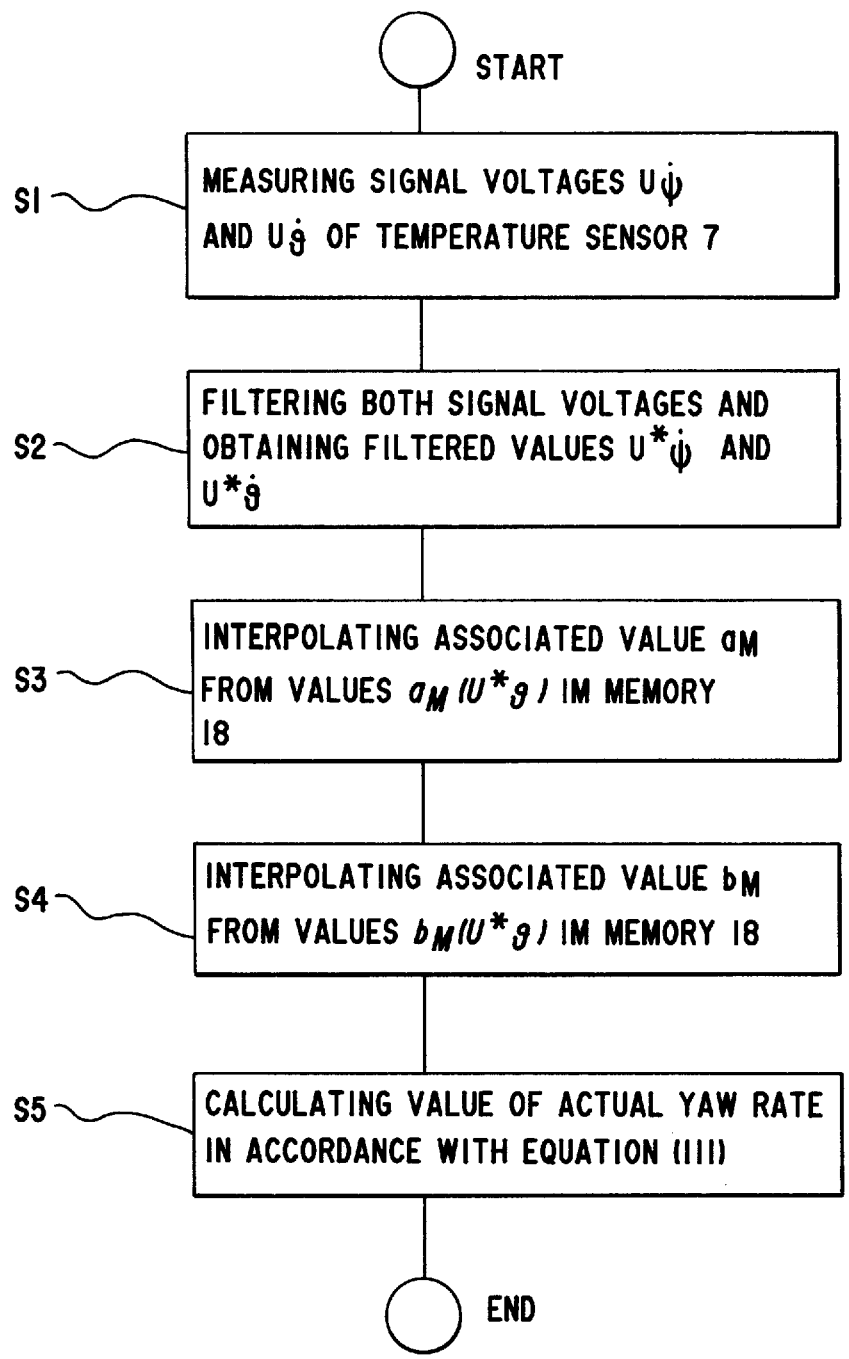

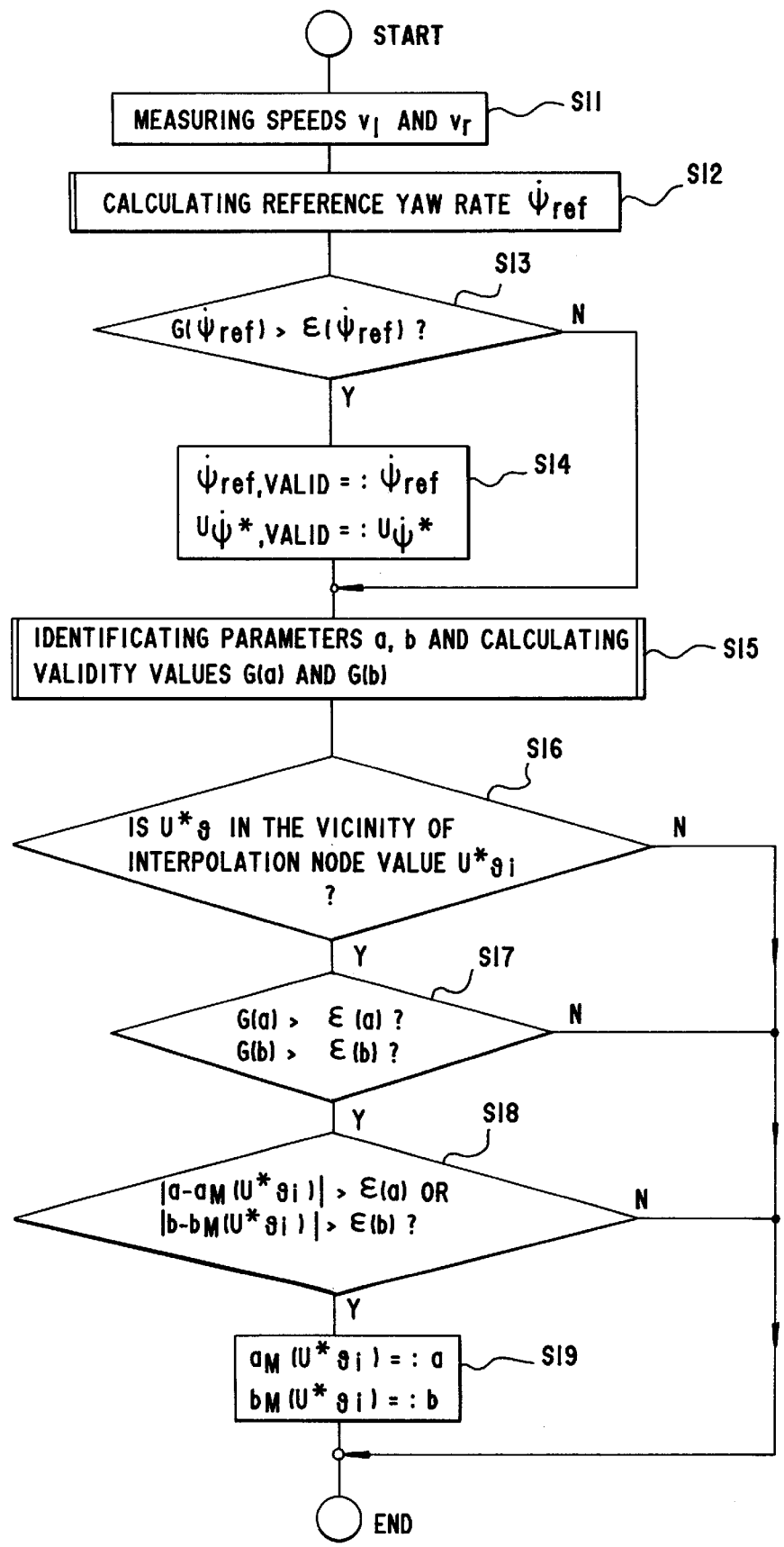

CIRCUIT CONFIGURATION FOR EVALUATION OF THE SIGNALS FROM A YAW RATE SENSOR

CROSS-REFERENCE TO RELATED APPLICATION

This application is a continuation of application Ser. No. 08/656,413, filed on May 30, 1996, now abandoned, which application is a continuation of International Application Serial No. PCT/DE94/01341, filed Nov. 14, 1994.

BACKGROUND OF THE INVENTION

Field of the Invention

The invention relates to a circuit configuration for the evaluation of signals from a yaw rate sensor in a control loop, preferably for movement stability regulation in a motor vehicle, having a temperature sensor for compensation of a temperature dependency of the sensor signal.

Such a configuration can be used, for example, in a yaw regulator for improving the movement stability of a motor vehicle, for example to compensate for incorrect movement maneuvers by the driver or as a result of a side wind. Yaw movements are rotations of the motor vehicle about its vertical axis, that is to say about an axis running at right angles to the roadway surface, through the center of gravity of the vehicle.

Vehicle manipulated variables for yaw regulation can be either asymmetric braking of the vehicle by operating the brakes exclusively on one side of the vehicle or with a different intensity on one side of the vehicle, or by adjustment of a rear axle steering angle in the case of a motor vehicle having rear wheel steering.

In the case of a device for regulation of the vehicle movement, which is known from German Published, Non-Prosecuted Patent Application DE 39 19 347 A1, corresponding to U.S. Pat. No. 4,898,431, the influence of destabilizing forces on the vehicle is determined by measurement of a current "yaw level", wherein a desired yew level is determined and is compared with the current yaw level, and the brakes are operated in accordance with the comparison result, in order to keep the vehicle stable.

The yaw rate is measured by using a yaw rotation rate sensor (also referred to as a yaw rate sensor) and is converted into an electrical signal. The quality of the sensor which is used is the governing factor determining the accuracy of the movement stability regulation. Economically mass-produced yaw rate sensors which can be used in motor vehicles are based, for example, on the principle of measurement of the influence of the Coriolis force on a vibrating ceramic structure (see an article by C. H. J. Fox entitled: Vibrating Cylinder Gyro—Theory of Operation and Error Analysis, University of Stuttgart Gyro Symposium, September 1988) or on a component like a tuning fork (see JEE, September 1990, pages 99 to 104).

The major technical problem in particular in the case of cost-effective sensors is that the characteristic parameters (gradient and zero ordinate) are heavily dependent on the temperature and that such temperature dependency is itself subject to a high degree-of-scatter from sensor to sensor in the case of mass-produced sensors. It is known from practice for a temperature sensor to be provided and the dependency of that sensor signal on the temperature to be corrected for computationally.

SUMMARY OF THE INVENTION

It is accordingly an object of the invention to provide a circuit configuration for evaluation of the signals from a yaw rate sensor, which overcomes the hereinafore-mentioned disadvantages of the heretofore-known devices of this general type and which compensates for a temperature dependency of characteristic parameters which is specific to an individual sensor in addition to an influence of temperature on a sensor signal.

With the foregoing and other objects in view there is provided, in accordance with the invention, in a control loop, especially for movement stability regulation in a motor vehicle, having a yaw rate sensor supplying an electrical sensor signal and a temperature sensor supplying an electrical sensor signal for compensation of temperature dependency of the sensor signal of the yaw rate sensor, a circuit configuration for evaluation of the sensor signal of the yaw rate sensor, comprising a first evaluation device for calculating an instantaneous yaw rate from the electrical sensor signals of the yaw rate sensor and of the temperature sensor; and a second evaluation device for adaptively determining sensor-specific characteristic parameters of the yaw rate sensor as a function of temperature; a reference yaw rate $\dot{\Psi}_{ref}$ being calculated from measured wheel rotation speed values $v_1$ and $v_r$ in accordance with the following formula:

$$\dot{\Psi}_{ref} = \frac{v_l - v_r}{l_{trackw}}$$

being taken into account, where $l_{trackw}$ designates a distance between two centers of contact of wheels on a non-driven axle with the ground.

In accordance with another feature of the invention, the first evaluation device calculates a measurement value for a yaw rate within one control cycle in accordance with the following relationship:

$$\dot{\Psi}_{act.M} = a_M * U^*_\psi + b_M$$

where $U^*_\psi$ is a filtered value of a temperature-dependent sensor signal; $a_M$ is an interpolated temperature-dependent gradient of an inverse sensor signal characteristic; and $b_M$ is an interpolated temperature-dependent zero value of an inverse sensor original characteristic.

In accordance with a further feature of the invention, a validity value for the reference yaw rate is calculated on a fuzzy logic basis.

In accordance with an added feature of the invention, there is provided a yaw rate regulator having an input receiving a fed back conditioned output signal from the yaw rate sensor.

In accordance with an additional feature of the invention, a reference yaw rate is calculated from the measured wheel rotation speed values of the non-driven axle.

In accordance with a concomitant feature of the invention, the filtered values for randomly scattered wheel rotation speed signals are obtained by smoothing a magnitude of a time derivative of the wheel rotation speeds.

Other features which are considered as characteristic for the invention are set forth in the appended claims.

Although the invention is illustrated and described herein as embodied in a circuit configuration for evaluation of the signals from a yaw rate sensor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a flow diagram of a first evaluation device of the control loop according to FIG. 1; and FIG. 5 is a flow diagram of a second, adaptive evaluation device of the control loop according to FIG. 1.

DESCRIPTION OF THE PREFERRED EMBODIMENTS

Figure 1:
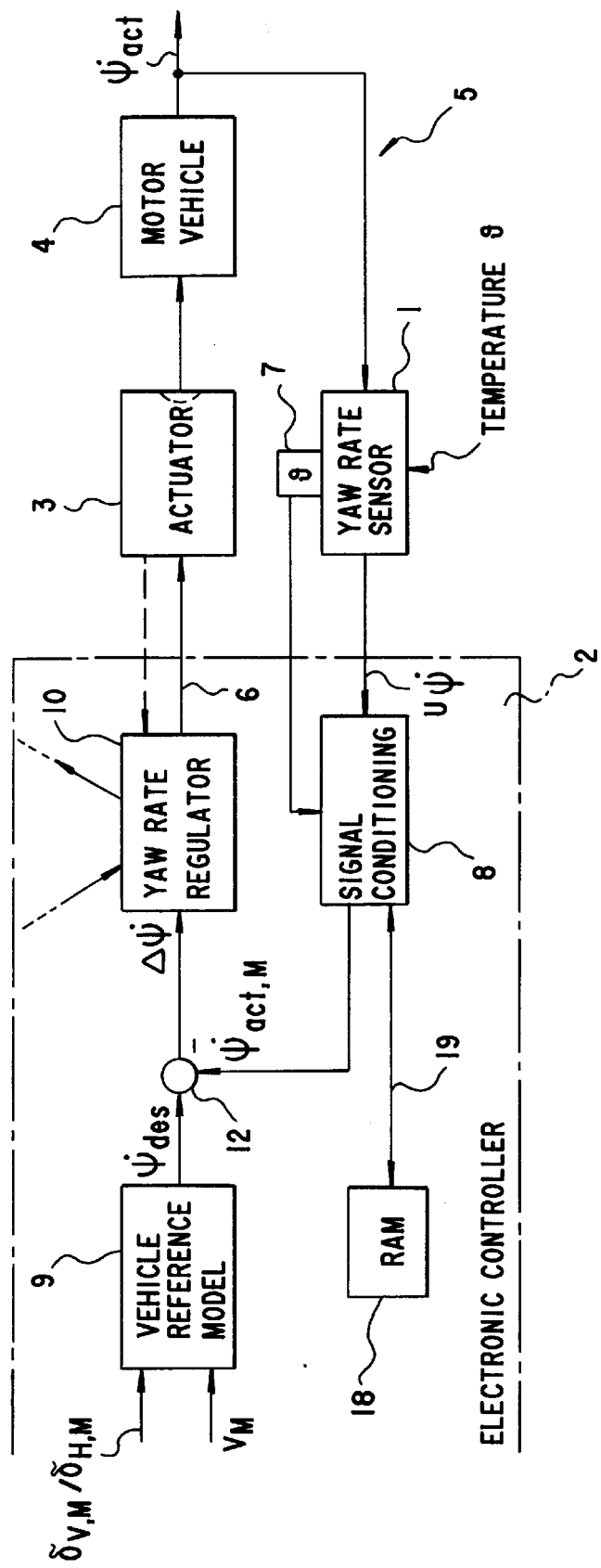
FIG. 1 is a block circuit diagram of a yaw rate control loop for a motor vehicle.

Referring now to the figures of the drawings in detail and first, particularly, to FIG. 1 thereof, there is seen a yaw rate control loop 5 which essentially has the following components: a yaw rate sensor 1, an electronic controller 2, an actuator 3 and a motor vehicle 4, having a yaw rate which is measured by the sensor 1. The actuator 3 receives actuating signals over a signal line 6 from the electronic controller 2 and then produces yaw moments, that is to say rotation moments about the vertical axis of the motor vehicle 4. As mentioned, this can be effected by braking with different intensity on the left and on the right side of the vehicle or else by steering the rear axle of the motor vehicle 4. The yaw rate sensor 1, the actuator 3 and the motor vehicle 4 are generally known and are therefore only illustrated as blocks in the drawing. The yaw rate sensor is provided with a temperature sensor 7, which transmits a sensor temperature to a signal conditioning circuit 8 in the controller 2.

The controller 2 also contains a computation circuit 9 and a yaw rate regulator 10. The signal conditioning circuit 8 processes an output signal from the yaw rate sensor 1 in a manner which is still to be described. An output signal from the signal conditioning circuit 8 is the measured actual yaw rate $\dot{\Psi}_{act,M}$. This actual yaw rate is fed back through an inverting input of a comparator 12 to an input of the yaw rate regulator 10. A desired value of the yaw rate $\dot{\Psi}_{des}$, which is an output signal from the computation circuit 9, is passed to a positive input of the comparator 12. The following signals are processed in this computation circuit 9, for example on the basis of a vehicle reference model: a front axle steering angle $\delta_{V,M}$ or a steering wheel angle $\delta_{H,M}$ and a vehicle reference speed $v_M$, that is to say the speed at which the motor vehicle is actually moving.

A chassis of the motor vehicle 4 converts a yaw moment, which is additionally applied by the actuator 3, into a changed actual yaw rate $\dot{\Psi}_{act}$ that is measured by the yaw rate sensor 1 and is converted into a corresponding electrical signal $U_\Psi$. This electrical signal, which is preferably in the form of an electrical voltage, is conditioned in the electronic controller 2 and is compared, as the measured yaw rate $\dot{\Psi}_{act,M}$, that is to say as a controller-internal signal which represents the actual value of the yaw rate, in the comparator 12, with the desired yaw rate $\dot{\Psi}^*_{des}$. A difference $\Delta\dot{\Psi}$ between these two values is passed as a control error to an input of the yaw rate regulator 10. An output signal of the yaw rate regulator 10, for example an electrical current, controls the actuator 3.

Figure 2:
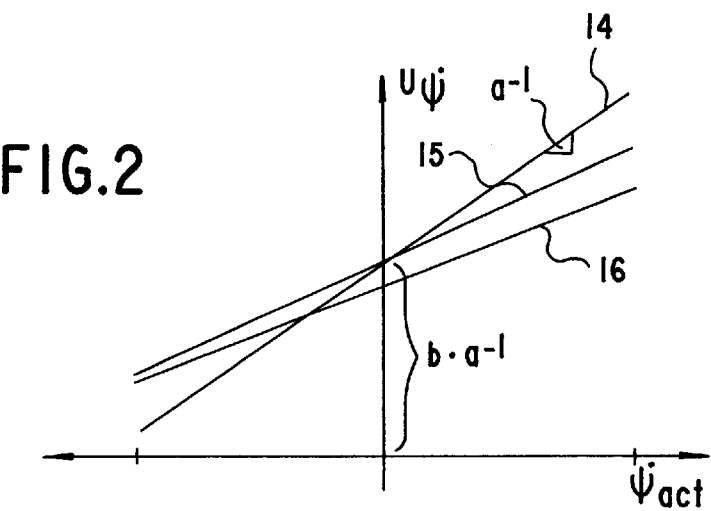
FIG. 2 is a diagram showing characteristics of rotation rate sensors which are used in the control loop.

FIG. 2 illustrates characteristics of commercially available rotation rate sensors used in this control loop. A nominal characteristic 14 has a gradient $a^{-1}$ and an offset value $-b \cdot a^{-1}$. A second characteristic 15 has a gradient which differs from that of the nominal characteristic 14, and a characteristic 16 has a gradient which differs from that of the nominal characteristic 14 and a changed offset value shown in FIGS. 3a and 3b. The electrical output signal $U_\Psi$ from the sensor changes essentially linearly with the yaw rate acting on the sensor. Consequently, the characteristic of such a sensor can be described by the following formula:

$$U_\Psi = a^{-1} * \dot{\Psi}_{act} - b * a^{-1} \tag{I}$$

where $a^{-1}$ is the gradient of the characteristic and $-b \cdot a^{-1}$ is its zero ordinate, that is to say the output value of the sensor at a yaw rate of zero (also called the offset value). However, these values are not constant. On one hand, the major technical problems of cost-effective yaw rate sensors for motor vehicles, in particular, are that the variables $a^{-1}$ and $-b \cdot a^{-1}$ are severely influenced by the temperature. This applies in particular to so-called VSG sensors (VSG= Vibrating Structure Gyros). On the other hand, the profile of the variables a and b with respect to the temperature is scattered severely from sensor to sensor, even in mass-produced sensors.

Figure 3A:
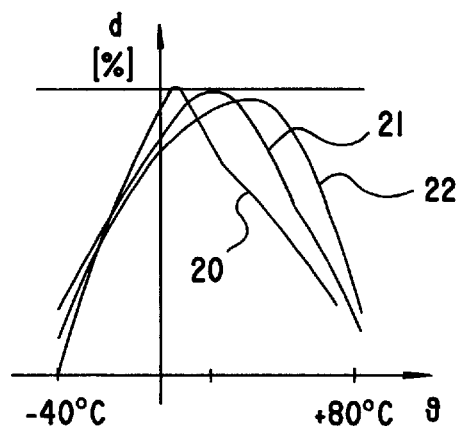
FIGS. 3a and 3b are diagrams showing examples of sensor-specific profiles, that is to say profiles which are subjected to scatter from sensor to sensor, of a relative radiant change and of an offset value with respect to a sensor temperature.
Figure 3B:
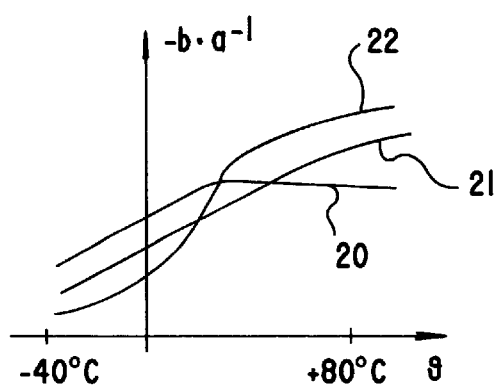

Examples of a sensor-dependent scatter of a relative gradient change d of the characteristic are plotted in FIG. 3a, and examples of a scattering offset value $-b \cdot a^{-1}$ of the characteristic are plotted in FIG. 3b, in each case with respect to the sensor temperature, to be precise for three different yaw rate sensors 20, 21 and 22. The relative gradient change d is given by the following formula:

$$d = \frac{1}{a \cdot c} - 1, \tag{II}$$

where the variable c represents an actual constant nominal gain of the sensor using the units volts/(degrees/second).

The temperature dependency of the characteristic variables a and b of the yaw rate sensor, which temperature dependency is subject to scatters, thus leads to direct scatters of the movement behavior resulting from the control loop according to FIG. 1. In this case, offset errors in the sensor, for example, can be seen in the apparent presence of side wind.

In the case of previous yaw rate sensors, it is known from practice for the sensor temperature to be detected and the dependency of the characteristic gradients $a^{-1}$ and of the characteristic offset $-b \cdot a^{-1}$ to be modeled by a nominal characteristic. In that case, although temperature compensation of the characteristic properties is possible for a normal sensor, the sensor-dependent scatter of the profile $a^{-1}$ and of $-b \cdot a^{-1}$ however, cannot be detected in this case.

The problems are solved in such a way that the sensor-dependent temperature distribution of the sensor characteristic gradient $a^{-1}$ and of the sensor offset $-b \cdot a^{-1}$ in the evaluation circuit described herein are adapted by additional evaluations of sensor signals, in particular the rotation speed difference between the wheels of a non-driven axle, for the respective yaw rate sensor in the controller, that is to say they are improved in a type of continuous "learning process". To this end, the processing or evaluation of the signals from the yaw rate sensor is split into two regions or imaginary "levels":

In a so-called regulation cycle region, a controller-internal measured value for the yaw rate is calculated by a first evaluation device in the signal conditioning circuit 8, corresponding to a flow diagram of a program section which can be seen in FIG. 4, in accordance with the following relationship:

$$\dot{\Psi}_{act,M} = a_M * U^*_\psi + b_M \qquad (III)$$

where:
- $U^*_\psi$ is a filtered value of the temperature-dependent sensor signal,
- $a_M$ is an interpolated temperature-dependent gradient of the inverse sensor signal characteristic, and
- $b_M$ is an interpolated temperature-dependent zero value of the inverse sensor signal characteristic.

The object of this first evaluation device, which is implemented in this case as an algorithm, is to calculate the current vehicle yaw rate $\dot{\Psi}_{act,M}$, as accurately as possible from the electrical signals for the yaw rate and from an electrical signal $U_8$ for the temperature of the sensor element. To this end, the filtered signal from the yaw rate sensor 1 is multiplied by a value $a_M$, which is adapted as a function of temperature, for the characteristic gradient and subsequently has added to it a value $b_M$, which is adapted as a function of temperature, for the characteristic offset. It is recommended that the signal from the yaw rate sensor be filtered in accordance with one of the generally known procedures in order to compensate for random fluctuations in the measured signal and the disturbing influence on the control loop resulting therefrom.

The values of $a_M$ and $b_M$ are taken from a read/write memory 18 in the controller 2, which is connected through a line 19 to the signal conditioning circuit 8. These values are stored in the memory 14 as a function of the temperature. It must also be possible to write to the memory 15 since the table values for $a_M$ and $b_M$ must be written to the main memory repeatedly as a "learning success" of the controller 2 continues, using an adaptive evaluation device described further below. The memory 18 is constructed in such a way that the table values which have been written into it are maintained when the power supply of the controller 2 is turned off, that is to say it is constructed either as a battery-buffered RAM or as an E²PROM memory.

The first evaluation is carried out within one cycle of the control loop 5, in such a way that the algorithm described above is processed in accordance with the flow diagram which can be seen in FIG. 4:

After a start, the signal voltage UT of the yaw rate sensor 1 and the signal voltage $U_\theta$ of the temperature sensor 7 are measured in a step S1.

These two signal voltages are filtered in a step S2 and the filtered values $U^*_\psi$ and $U_\theta$ are thus obtained.

The associated value $a_M$ is interpolated, in a step S3, from the values $a_M(U^*_\theta)$ stored in the table of the memory 18.

The associated value $b_M$ is interpolated in a step S4 from the table of values $b_M(U^*_\theta)$ stored in the memory.

In a step S5, the measured value of the actual yaw rate is calculated in accordance with the equation (III), including the described corrections. The end of the subroutine is thus reached.

A second evaluation device in the signal conditioning circuit 8 operates at a so-called adaptation level and it does not need to run in synchronism with the regulator cycle. Its object is to determine the actual profiles, which are specific to the respective sensor, of the characteristic gradient a and of the sensor offset b as a function of the temperature of the yaw rate sensor 1, and to store the determined values in the tables in the memory 18 in the controller 2. The second evaluation device thus carries out an adaptation, which is also referred to as identification, that will now be explained with reference to the flow diagram in FIG. 5:

The start of the adaptation of the characteristic parameters a and b takes place at a sampling time k. A precondition for the determination of the actual values a and b is the presence of a measure, which is valid at least at times, of the actual yaw rate of the vehicle. This actual yaw rate is called the reference yaw rate $\dot{\Psi}_{ref}$. An information item, which is plausible at least at times, about the reference yaw rate, is given by the rotation speeds of the wheels of a non-driven axle of the motor vehicle. These wheel rotation speeds or rpms are already available as a rule, for example for ABS control or anti-traction control, in the controller 2. In the following text, reference symbols $v_1$ and $v_r$ designate the wheel speeds of the left-hand and right-hand wheel, respectively, of this non-driven axle.

The wheel speeds $v_1$ and $v_r$ are measured in a step S11. So-called wheel compensation, using one of the generally known procedures, is carried out in order to compensate for the influences of different tire rolling circumferences.

The reference yaw rate $\dot{\Psi}_{ref}$ is calculated from the measured wheel rotation speed values $v_1$ and $v_r$ in a step S12. This can be calculated, for example, in accordance with the following simple formula:

$$\dot{\Psi}_{ref} = \frac{v_1 - v_r}{l_{trackw}} \qquad (IV)$$

where $l_{trackw}$ designates a distance between two centers of contact with the ground of the wheels on the non-driven axle.

Since this formula has only a limited validity range, a validity value $G(\dot{\Psi}_{ref})$ is also calculated in the step S12 which represents a continuous measure of the validity of the calculated reference yaw rate, for example:

$G(\dot{\Psi}_{ref})=0$ means: $\dot{\Psi}_{ref}$ is always invalid $G(\dot{\Psi}_{ref})=1$ means: $\dot{\Psi}_{ref}$ is always valid $G(\dot{\Psi}_{ref})$ is dependent on the movement state of the motor vehicle. The value of $\dot{\Psi}_{ref}$ calculated in accordance with the equation (IV) thus contains errors when:
- the vehicle is accelerating or decelerating,
- controlled yaw processes (for example steering the rear axle or asymmetric braking) are currently active, or
- the vehicle is moving on a highly uneven roadway.

The calculation of $G(\dot{\Psi}_{ref})$ therefore has to process these parameters which are dependent on the motion state. A method which operates on the fuzzy-logic principle is particularly suitable for this purpose, to be precise using the following basic rules:

Rule 1:

Default: $G(\dot{\Psi}_{ref})$=valid

Rule 2:

If
  (acceleration=not_small) or
  (deceleration=not_small) then $G(\dot{\Psi}_{ref})$=not valid Rule 3:

If
  (rear wheel steering=not_small) or
  (asymmetric braking)=active)

then $G(\dot{\Psi}_{ref})$=not_valid

Rule 4:

If
   (filtered scatter of $v_l$=large)
   or (filtered scatter of $v_r$=large) then $G(\dot{\Psi}_{ref})$=not valid In this case, "Default" means that this consequence is in effect when all of the other rules are not valid.

Filtered values for the randomly scattered wheel rotation speed signals can be obtained, for example, by known PT1 smoothing of the magnitude of the time derivative of the wheel rotation speeds ($|\dot{v}|$).

A predetermined boundary value $\epsilon(\dot{\Psi}_{ref})$ is used in a step S13 to decide whether or not the currently calculated value $\dot{\Psi}_{ref}$ and the currently measured and filtered value $U^*_{\psi}$ can actually be used for further identification of a and b. If $$G(\dot{\Psi}_{ref}) > \epsilon(\dot{\Psi}_{ref}),$$

the values $\dot{\Psi}_{ref}$ and $U^*\dot{\Psi}$ are renamed in a step S14 as $\dot{\Psi}_{ref,valid}$ and $U^*_{\psi,valid}$ and are provided as input-signals for identification in a step S15. The parameters a and b are identified from these input signals, and associated validity values G(a) and G(b) are calculated in an analogous manner to the step S13. The calculation is carried out as follows:

$$a = \frac{\dot{\Psi}_{ref,valid(k+n)} - \dot{\Psi}_{ref,valid(k)}}{U^*_{\psi,valid(k+n)} - U^*_{\psi,valid(k)}}$$

$$b = \dot{\Psi}_{ref,valid(k+n)} - a \cdot U^*_{\psi,valid(k+n)}$$

where k is the number of the current sampling time and n is automatically adapted in such a way that the difference which can be evaluated in a numerically favorable manner is produced in the denominator of the formula for a, and natural dynamic processes in the yaw rate sensor itself are prevented.

The validity values G(a) and G(b) are expediently determined using the following fuzzy-logic basis:

Rule 1:

Default:
   G (a)=not_valid
   G (b)=not_valid

Rule 2:

If
   ($|U^*_\theta(k+n) - U^*_\theta(k)|$=small)
   ($|$nominated difference$|$=large)
   then G (a)=valid, G (b)=valid.

The subsequent steps S16, S17 and S18 are used to replace the interpolation nodes $a_M(U^*_\theta)$ as well as $b_M(U^*_\theta)$ by the new identified values a and b (step 19) only when:

the current sensor temperature θ is actually "in the vicinity" of an interpolation node value $^*\theta_i$ (step S15) and the validity values G(a) and G(b) for the identified values a and b are greater than predetermined limits ε(a) and ε(b) (step 17) and there is any clear distinction whatsoever between the newly identified values a and b at the interpolation node $θ_1$ and the previously stored table interpolation nodes $a_M(U^*_{\theta 1})$ and $b_M(U^*_{\theta 1})$, respectively, (step S18).

The last-mentioned step S18 is therefore of particular importance, since the newly identified interpolation node values must be protected in a memory, for example in an $E^2$PROM, when the ignition, and thus the supply voltage for the controller, are switched off. Memory cells in such a memory can be written to only a maximum of 10,000 to 100,000 times.

In summary, the following processes are carried out in the evaluation according to FIG. 5: in steps S11 to S14, the reference yaw rate and the associated actual value of the sensor signal $U_\psi$ are determined at the current temperature θ. The step S13 is used to determine that the values are transferred when the reference yaw rate is valid. The step S17 is used to determine whether or not valid identifications are present for the values a and b. The step S18 is used to determine whether or not the errors in the identified parameters a and b are greater than predetermined thresholds with respect to the previously stored table values. If yes, a and b are transferred as new table values. In this way, the program, which belongs to the second evaluation device, reaches its end.

I claim:

1. In a control loop having a yaw rate sensor supplying an electrical sensor signal and a temperature sensor supplying an electrical sensor signal for compensation of temperature dependency of the sensor signal of the yaw rate sensor, a circuit configuration in the control loop for temperature-compensation of the sensor signal of the yaw rate sensor, comprising:

a first evaluation device for calculating an instantaneous yaw rate from the electrical sensor signals of the yaw rate sensor and of the temperature sensor; and a second evaluation device for adaptively determining sensor-specific characteristic parameters of the yaw rate sensor as a function of temperature;

said first evaluation device calculating a reference yaw rate $\Psi_{ref}$ in accordance with the following formula:

$$\dot{\Psi}_{ref} = \frac{v_l - v_r}{l_{trackw}}$$

where $l_{trackw}$ designates a distance between two centers of contact of wheels on a non-driven axle with the ground, and $v_1$ and $v_r$ designate speed values of a left and right wheel, respectively, of the non-driven axle, and wherein said first evaluation device calculates a measurement value for a yaw rate within one control cycle in accordance with the following relationship:

$$\Psi_{act,M} = a_M * U^*_\psi + b_M$$

where:

$U^*_\psi$ is a filtered value of the yaw rate sensor signal;

$a_M$ is a temperature-dependent gradient of an inverse characteristic of the yaw rate sensor signal, the gradient being interpolated from changes in the reference yaw rate $\Psi_{ref}$ and from changes in the filtered value of the yaw rate sensor signal; and $b_M$ is a temperature-dependent zero value of an inverse characteristic of the yaw rate sensor signal, the zero value being determined from the reference yaw rate $\Psi_{ref}$ and the filtered value of the yaw rate sensor signal.

2. The circuit configuration according to claim 1, wherein a validity value for the reference yaw rate is calculated on a fuzzy logic basis.

3. The circuit configuration according to claim 1, including a closed loop yaw rate controller having an input receiving a fed back conditioned output signal from the yaw rate sensor.

4. The circuit configuration according to claim 1, wherein the reference yaw rate is calculated from the measured wheel rotation speed values of the non-driven axle.

5. The circuit configuration according to claim 5, wherein filtered values for randomly scattered wheel rotation speed signals are obtained in said second evaluation device by smoothing a magnitude of a time derivative of the wheel rotation speeds.

6. In a control loop for movement stability regulation in a motor vehicle, having a yaw rate sensor supplying an electrical sensor signal and a temperature sensor supplying an electrical sensor signal for compensation of temperature dependency of the sensor signal of the yaw rate sensor, a circuit configuration in the control loop for temperature-compensation of the sensor signal of the yaw rate sensor, comprising:

a first evaluation device for calculating an instantaneous yaw rate from the electrical sensor signals of the yaw rate sensor and of the temperature sensor; and a second evaluation device for adaptively determining sensor-specific characteristic parameters of the yaw rate sensor as a function of temperature;

said first evaluation device calculating a reference yaw rate $\Psi_{ref}$ in accordance with the following formula:

$$\Psi_{ref} = \frac{v_l - v_r}{l_{trackw}}$$

where $l_{trackw}$ designates a distance between two centers of contact of wheels on a non-driven axle with the ground, and $v_1$ and $v_r$ designate speed values of a left and right wheel, respectively, of the non-driven axle, and the calculated reference yaw rate $\Psi_{ref}$ is used in the calculation of the instantaneous yaw rate.

* * * * *